(12) United States Patent
Fyke

(10) Patent No.: US 7,646,897 B2
(45) Date of Patent: Jan. 12, 2010

(54) APPARATUS AND METHOD OF INPUT AND FINGER PRINT RECOGNITION ON A HANDHELD ELECTRONIC DEVICE

(75) Inventor: Steven H. Fyke, Fort Erie (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 12/393,240

(22) Filed: Feb. 26, 2009

(65) Prior Publication Data

US 2009/0221272 A1  Sep. 3, 2009

Related U.S. Application Data

(63) Continuation of application No. 10/849,928, filed on May 21, 2004, now Pat. No. 7,505,611.

(30) Foreign Application Priority Data

May 21, 2003 (GB) ................. 0311794.2

(51) Int. Cl.
*G06K 9/00* (2006.01)
(52) U.S. Cl. ..................................... 382/124
(58) Field of Classification Search ................ 382/115, 382/124, 181, 313; 283/68–70; 713/186; 902/3
See application file for complete search history.

(56) References Cited

U.S. PATENT DOCUMENTS

| 6,219,793 | B1 | 4/2001 | Li et al. |
| 6,327,376 | B1 | 12/2001 | Harkin |
| 6,360,004 | B1 | 3/2002 | Akizuki |
| 6,401,551 | B1 | 6/2002 | Kawahara et al. |
| 7,020,308 | B1 * | 3/2006 | Shinzaki et al. ............. 382/124 |
| 2002/0163601 | A1 | 11/2002 | Min, II et al. |
| 2002/0180585 | A1 | 12/2002 | Kim et al. |

FOREIGN PATENT DOCUMENTS

| EP | 1043698 | 10/2000 |
| EP | 1257111 | 11/2002 |
| EP | 1434162 | 6/2004 |
| WO | WO01/59558 | 8/2001 |

OTHER PUBLICATIONS

Patent Abstracts of Japan, vol. 2000, No. 23, Feb. 10, 2001 & JP 2001 155317 A (Mitsubishi Electric Corp.), Jun. 8, 2001, abstract.

* cited by examiner

*Primary Examiner*—Daniel G Mariam
(74) *Attorney, Agent, or Firm*—Heenan Blaikie LLP

(57) ABSTRACT

An apparatus for input and fingerprint recognition comprises a touch surface, and a data processor coupled to the touch surface. The touch surface comprises a first region and a second region. The second region is distinct from and coplanar with the first region and occupies a minor portion of a total surface area of the touch surface. The data processor is configured to selectively operate the touch surface in a touch input mode or a fingerprint detection mode. In the touch input mode, the data processor is configured to operate the second region at a first resolution comparable to that of the first region to detect a touch input anywhere on the touch surface. In the fingerprint detection mode, the data processor is configured to operate the second region at a higher resolution than the first resolution to detect a fingerprint on the second region.

12 Claims, 5 Drawing Sheets

APPARATUS AND METHOD OF INPUT AND FINGER PRINT RECOGNITION ON A HANDHELD ELECTRONIC DEVICE

RELATED APPLICATIONS

This patent application is a continuation of U.S. patent application Ser. No. 10/849,928, filed May 21, 2004 (which is now U.S. Pat. No. 7,505,611 issued on Mar. 17, 2009), entitled "Apparatus and Method of Input and Finger Print Recognition on a Handheld Electronic Device".

FIELD

This patent application relates to mobile communication techniques in general, and to an apparatus and method of input and finger print recognition on a handheld electronic device in particular.

BACKGROUND

Touch pads are known techniques of computer input. A touch pad has a flat surface capable of producing a signal when the flat surface is touched with a finger.

Finger print recognition is a known technique of biometric systems, utilized for recognizing the identity of a person based on physiological characteristics.

Both techniques are typically not provided simultaneously in handheld electronic devices. Although touch pads and finger print devices are common, touch pads may have very low resolution, and may use an interpretive algorithm to increase the apparent resolution, whereas finger print devices may have very high resolution. The limited surface area of a handheld electronic device may exclude the use of both touch pads and fingerprint devices simultaneously.

BRIEF DESCRIPTION OF THE DRAWINGS

Same reference numerals are used in different figures to denote similar elements.

DETAILED DESCRIPTION

Figure 1:
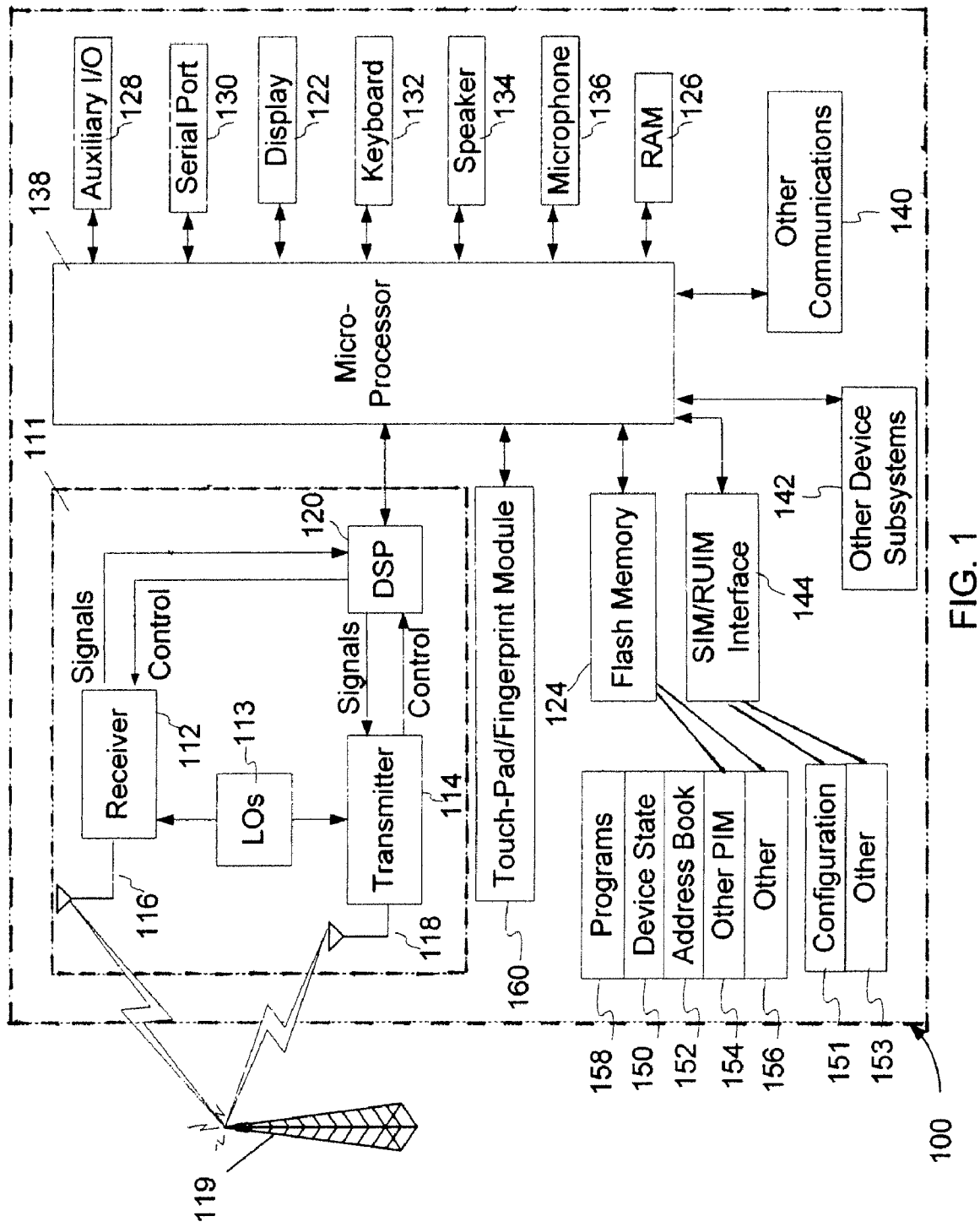
FIG. 1 is a block diagram illustrating a mobile station capable of co-operating with preferred embodiments of the apparatus and method of the current application.

In a first aspect, this patent application relates to an apparatus for input and fingerprint and recognition. The apparatus comprises a touch surface and a data processor that is coupled to the touch surface. The touch surface comprising a first region and a second region. The second region is distinct from and coplanar with the first region and occupies a minor portion of a total surface area of the touch surface.

The data processor is configured to selectively operate the touch surface in a touch input mode or a fingerprint detection mode. In the touch input mode, the data processor is configured to operate the second region at a first resolution comparable to that of the first region to detect a touch input anywhere on the touch surface. In the fingerprint detection mode, the data processor is configured to operate the second region at a higher resolution than the first resolution to detect a fingerprint on the second region.

The second region may be disposed proximate an end of the touch surface. In one implementation of the apparatus, the apparatus also comprises a housing, the touch surface and the data processor are disposed within the housing, and the housing is configured for releasable attachment to a handheld electronic device.

The housing may have a communication interface at one end thereof for interfacing with the handheld electronic device. The housing may have a shape that corresponds to that of the handheld electronic device.

The handheld electronic device may include a display screen on one side thereof, with the touch surface corresponding in shape to the display screen.

In a second aspect, this patent application relates to a handheld electronic device. The device comprises a housing, a display screen; and an apparatus for input and fingerprint recognition. The apparatus comprises a touch surface, and a data processor that is coupled to the touch surface. The touch surface comprises a first region and a second region. The second region is distinct from and coplanar with the first region and occupies a minor portion of a total surface area of the touch surface.

The data processor is configured to selectively operate the touch surface in one of a touch input mode and a fingerprint detection mode. In the touch input mode, the data processor is configured to operate the second region at a first resolution comparable to that of the first region to detect a touch input anywhere on the touch surface. In the fingerprint detection mode, the data processor is configured to operate the second region at a higher resolution than the first resolution to detect a fingerprint on the second region.

Preferably, the display screen and the touch surface are disposed within the housing, the display screen is disposed at one side of the housing, and the touch surface is disposed at another side of the housing opposite to the one side.

The touch surface may have a shape that is analogous to that of the display screen. The second region may be disposed proximate an end of the housing.

In one implementation, the handheld electronic device is a wireless device.

In a third aspect, this patent application relates to a method of input and fingerprint recognition that involves (1) operating a touch surface at a first resolution to detect a touch input anywhere on the touch surface, the touch surface comprising a first region and a second region, the second region being distinct from and coplanar with the first region and occupying a minor portion of a total surface area of the touch surface; and (2) operating the second region at a higher resolution than the first resolution to detect a fingerprint on the second region.

The higher resolution operating may comprise operating the second region at the higher resolution without operating the first region at the higher resolution.

Referring now to the drawings, FIG. 1 is a block diagram illustrating a mobile station capable of co-operating with preferred embodiments of the apparatus and method of the current application. Mobile station 100 is preferably a two-way wireless communication device having at least voice and data communication capabilities. Mobile station 100 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 100 is enabled for two-way communication, it will incorporate a communication subsystem 111, including both a receiver 112 and a transmitter 114, as well as associated components such as one or more, preferably embedded or internal, antenna elements 116 and 118, local oscillators (LOs) 113, and a processing module such as a digital signal processor (DSP) 120. As will be apparent to those skilled in the field of communications, the particular design of the communication subsystem 111 will be dependent upon the communication network in which the device is intended to operate. For example, mobile station 100 may include a communication subsystem 111 designed to operate within the Mobitex™ mobile communication system, the DataTAC™ mobile communication system, GPRS network, UMTS network, EDGE network or CDMA network.

Network access requirements will also vary depending upon the type of network 119. For example, in the Mobitex and DataTAC networks, mobile station 100 is registered on the network using a unique identification number associated with each mobile station. In UMTS and GPRS networks, and in some CDMA networks, however, network access is associated with a subscriber or user of mobile station 100. A GPRS mobile station therefore requires a subscriber identity module (SIM) card in order to operate on a GPRS network, and a RUIM in order to operate on some CDMA networks. Without a valid SIM/RUIM card, a GPRS/UMTS/CDMA mobile station may not be fully functional. Local or non-network communication functions, as well as legally required functions (if any) such as "911" emergency calling, may be available, but mobile station 100 will be unable to carry out any other functions involving communications over the network 100. The SIM/RUIM interface 144 is normally similar to a card-slot into which a SIM/RUIM card can be inserted and ejected like a diskette or PCMCIA card. The SIM/RUIM card can have approximately 64K of memory and hold many key configuration 151, and other information 153 such as identification, and subscriber related information.

When required network registration or activation procedures have been completed, mobile station 100 may send and receive communication signals over the network 119. Signals received by antenna 116 through communication network 119 are input to receiver 112, which may perform such common receiver functions as signal amplification, frequency down conversion, filtering, channel selection and the like, and in the example system shown in FIG. 1, analog to digital (A/D) conversion. A/D conversion of a received signal allows more complex communication functions such as demodulation and decoding to be performed in the DSP 120. In a similar manner, signals to be transmitted are processed, including modulation and encoding for example, by DSP 120 and input to transmitter 114 for digital to analog conversion, frequency up conversion, filtering, amplification and transmission over the communication network 119 via antenna 118. DSP 120 not only processes communication signals, but also provides for receiver and transmitter control. For example, the gains applied to communication signals in receiver 112 and transmitter 114 may be adaptively controlled through automatic gain control algorithms implemented in DSP 120.

Mobile station 100 preferably includes a microprocessor 138 which controls the overall operation of the device. Communication functions, including at least data and voice communications, are performed through communication subsystem 111. Microprocessor 138 also interacts with further device subsystems such as the display 122, flash memory 124, random access memory (RAM) 126, auxiliary input/output (I/O) subsystems 128, serial port 130, keyboard 132, speaker 134, microphone 136, a short-range communications subsystem 140 and any other device subsystems generally designated as 142.

Some of the subsystems shown in FIG. 1 perform communication-related functions, whereas other subsystems may provide "resident" or on-device functions. Notably, some subsystems, such as keyboard 132 and display 122, for example, may be used for both communication-related functions, such as entering a text message for transmission over a communication network, and device-resident functions such as a calculator or task list.

Operating system software used by the microprocessor 138 is preferably stored in a persistent store such as flash memory 124, which may instead be a read-only memory (ROM) or similar storage element (not shown). Those skilled in the art will appreciate that the operating system, specific device applications, or parts thereof, may be temporarily loaded into a volatile memory such as RAM 126. Received communication signals may also be stored in RAM 126.

As shown, flash memory 124 can be segregated into different areas for both computer programs 158 and program data storage 150, 152, 154 and 156. These different storage types indicate that each program can allocate a portion of flash memory 124 for their own data storage requirements. Microprocessor 138, in addition to its operating system functions, preferably enables execution of software applications on the mobile station. A predetermined set of applications that control basic operations, including at least data and voice communication applications for example, will normally be installed on mobile station 100 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 119. In a preferred embodiment, the PIM data items are seamlessly integrated, synchronized and updated, via the wireless network 119, with the mobile station user's corresponding data items stored or associated with a host computer system. Further applications may also be loaded onto the mobile station 100 through the network 119, an auxiliary I/O subsystem 128, serial port 130, short-range communications subsystem 140 or any other suitable subsystem 142, and installed by a user in the RAM 126 or preferably a non-volatile store (not shown) for execution by the microprocessor 138. Such flexibility in application installation increases the functionality of the device and may provide enhanced on-device functions, communication-related functions, or both. For example, secure communication applications may enable electronic commerce functions and other such financial transactions to be performed using the mobile station 100.

In a data communication mode, a received signal such as a text message or web page download will be processed by the communication subsystem 111 and input to the microprocessor 138, which preferably further processes the received signal for output to the display 122, or alternatively to an auxiliary I/O device 128. A user of mobile station 100 may also compose data items such as email messages for example, using the keyboard 132, which is preferably a complete alphanumeric keyboard or telephone-type keypad, in conjunction with the display 122 and possibly an auxiliary I/O device 128. Such composed items may then be transmitted over a communication network through the communication subsystem 111.

For voice communications, overall operation of mobile station 100 is similar, except that received signals would preferably be output to a speaker 134 and signals for transmission would be generated by a microphone 136. Alternative voice or audio I/O subsystems, such as a voice message recording subsystem, may also be implemented on mobile station 100. Although voice or audio signal output is preferably accomplished primarily through the speaker 134, display 122 may also be used to provide an indication of the identity of a calling party, the duration of a voice call, or other voice call related information for example.

Serial port 130 in FIG. 1, would normally be implemented in a personal digital assistant (PDA)-type mobile station for which synchronization with a user's desktop computer (not shown) may be desirable, but is an optional device component. Such a port 130 would enable a user to set preferences through an external device or software application and would extend the capabilities of mobile station 100 by providing for information or software downloads to mobile station 100 other than through a wireless communication network. The alternate download path may for example be used to load an encryption key onto the device through a direct and thus reliable and trusted connection to thereby enable secure device communication.

Other communications subsystems 140, such as a short-range communications subsystem, is a further optional component which may provide for communication between mobile station 100 and different systems or devices, which need not necessarily be similar devices. For example, the subsystem 140 may include an infrared device and associated circuits and components or a Bluetooth™ communication module to provide for communication with similarly enabled systems and devices.

When used in co-operation with the apparatus and method provided according to the present application, Touch-pad/fingerprint module 160 includes software instructions that enable microprocessor 138 to carry out the various acts that are described below with reference to the remaining figures.

Figure 2A:
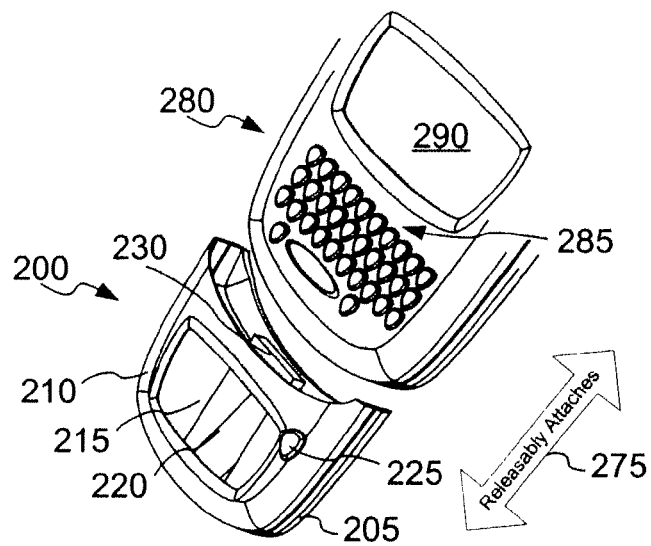
FIG. 2A is a front perspective view of a first peripheral embodiment of an apparatus provided in accordance with the present application.

Turning now to FIG. 2A,

FIG. 2A is a front perspective view of a first peripheral embodiment of an apparatus provided in accordance with the present application. A combined touch-pad/fingerprint peripheral 200 is provided to releasably attach along arrow 275 to a handheld electronic device 280. When attached to device 280, peripheral 200 enables a user to provide input and preferably control device 280 via peripheral 200. When detached from device 200, peripheral 200 may conveniently be stowed away. Depending on the particular handheld electronic device, device 280 can include a keyboard 285 and display 290. Peripheral 200 includes a rear face 205, a front face 210, a touch surface 215 having an integral fingerprint portion 220, as well as optional escape key 225, and communication interface 230.

Several features of the peripheral embodiment are a function of the specific device to which it releasably attaches. In the case of the exemplary peripheral 200 and exemplary device 280 of FIG. 2A, the shape and dimensions of rear face 205, front face 210, touch surface 215, and optional escape key 225 are preferably shaped and dimensioned in analogy to features of device 280. The combined thickness of rear face 205 and front face 210 is preferably the same as the thickness of device 280. The width of rear face 205 and front face 210 is preferably the same as the width of device 280. The general shape of peripheral 200 is analogous to the lower portion of device 280 so that the top face of peripheral 200 is designed to mate with the bottom face of device 280 and so that the bottom face of peripheral 200 is analogous to the bottom face of device 280. The general shape of touch surface 215 as viewed thru the front face 210 is analogous to screen 290 of device 280. The shape and size of escape key 225 (if provided) is analogous to the shape of the keys in keyboard 285 of device 280.

Figure 2B:
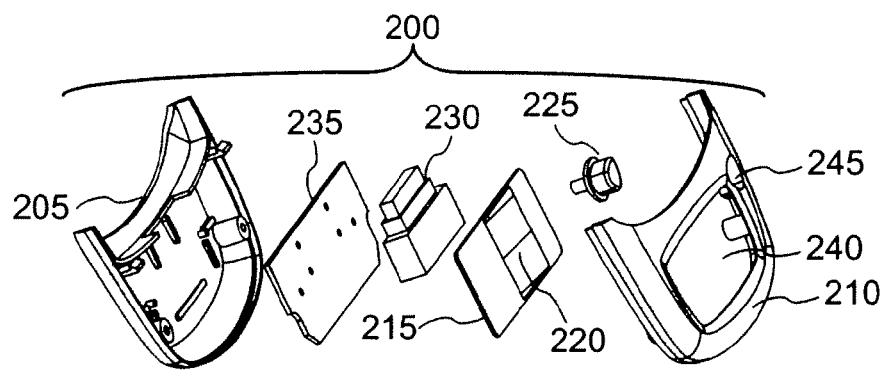
FIG. 2B is an exploded front perspective view of the apparatus of FIG. 2A.

Turning now to FIG. 2B,

FIG. 2B is an exploded front perspective view of the apparatus of FIG. 2A. A traversal from the rear face 205 to the front face 210 reveals additional features of peripheral 200. The rear face 205 supports a PCB (Printed Circuit Board) 235. Onto the PCB 235 is affixed communication interface 230 and touch surface 215 having fingerprint portion 220, as well as any other electronic components required such as a processor. Escape key 225 mates with an opening in front face 210 and is supported by the PCB 235 whereat a key sensor is affixed. The front surface 210 includes escape key hole 245 and touch surface port 240 which exposes portions of the escape key 225 and portions of the touch surface 215 respectively, the remaining portions and integral components of peripheral 200 housed by the assembly of front face 210 and rear face 205.

Figure 2D:
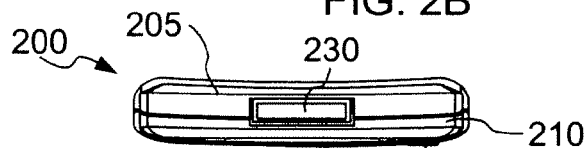
FIG. 2D is a top elevation view of the apparatus of FIG. 2A.
Figure 2C:
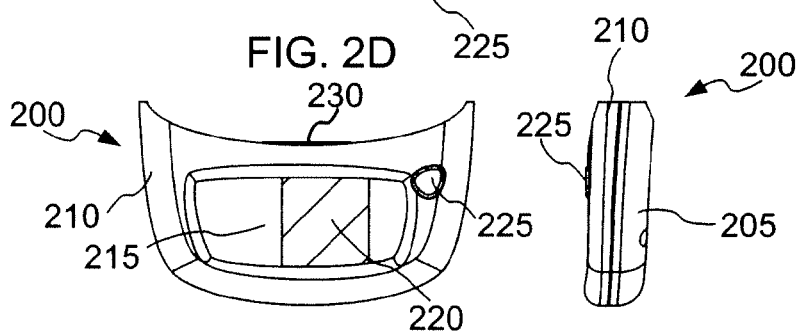
FIG. 2C is a front elevation view of the apparatus of FIG. 2A.

Turning now to FIG. 2C,

FIG. 2C is a front elevation view of the apparatus of FIG. 2A. In addition to providing a communications path between peripheral 200 and device 280, communication interface 230 also serves to support the peripheral 200 onto the device 280. Communication interface 230 is preferably dimensioned and positioned on peripheral 200 so that when peripheral 200 is attached to device 280, a mating fit is achieved between the bottom surface of device 280 and the top surface of peripheral 200. The dimensions of fingerprint portion 220 are preferably at least as big as the size of a human fingerprint.

Turning now to FIG. 2D,

FIG. 2D is a top elevation view of the apparatus of FIG. 2A. Communication interface 230 is provided on the top face of peripheral 200 to connect to a receiving interface (not shown) on the bottom face of device 280 thereby enabling a communication path to exist between device 280 and peripheral 200 when the peripheral is releasably attached to device 280, as well as achieving a mating fit of peripheral 200 with device 280 and providing structural support for peripheral 200 onto device 280.

Figure 2F:
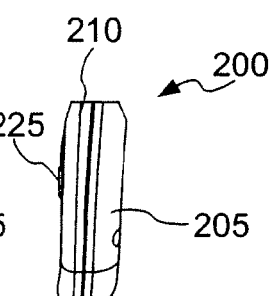
FIG. 2F is a right elevation view of the apparatus of FIG. 2A.
Figure 2E:
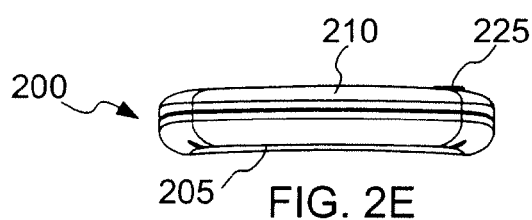
FIG. 2E is a bottom elevation view of the apparatus of FIG. 2A.

Turning now to FIG. 2E,

FIG. 2E is a bottom elevation view of the apparatus of FIG. 2A. Although not expressly shown, peripheral 200 can optionally be provided with a "pass-thru" communication interface on it's bottom face, and if so provided the "pass-thru" communication interface which is preferably analogous to the receiving interface on the device 280 so that the device and peripheral combination continues to posses an available communication interface while the peripheral 200 is releasably attached to the device 280.

Turning now to FIG. 2F,

FIG. 2F is a right elevation view of the apparatus of FIG. 2A. The combined thickness of rear face 205 and front face 210 is preferably the same as the thickness of device 280.

Figure 3A:
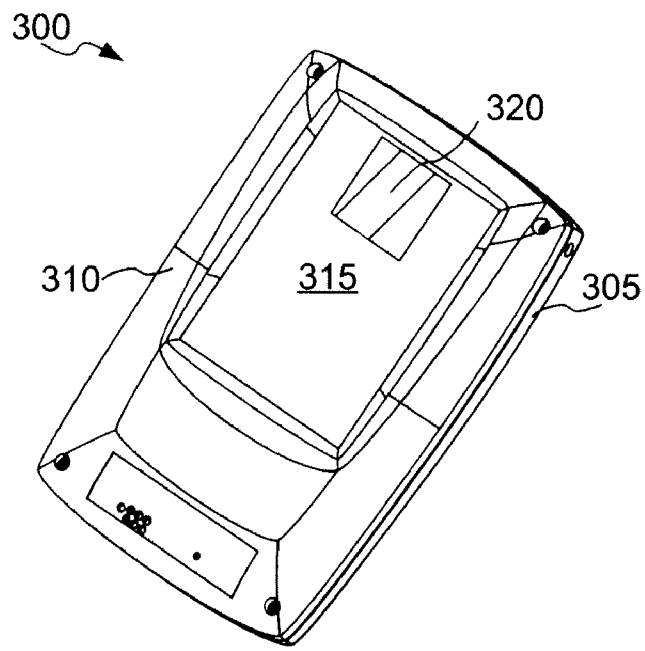
FIG. 3A is a rear perspective view of a second handheld device embodiment of an apparatus provided in accordance with the present application.

Turning now to FIG. 3A,

FIG. 3A is a rear perspective view of a second handheld device embodiment of an apparatus provided in accordance with the present application. A combined touch-pad/fingerprint is provided integral to handheld electronic device 300. Touch surface 315 and fingerprint portion 320 enable a user to provide input to and preferably control device 300. Preferably, touch surface 315 and fingerprint portion 320 are provided on the rear face 310 of device 300 so that the surface area of front face 305 can provide a more traditional user interface such as a screen and/or keyboard (not shown). Operationally, the user of device 300 can operate touch surface 315 and fingerprint portion 320 with one or more fingers of the hand which holds device 300, for instance by supporting the lower portion of rear face 310 in the palm while viewing front face 305 so as to allow at least one finger to access touch surface 315 and fingerprint portion 320.

Figures 3B, 3D:
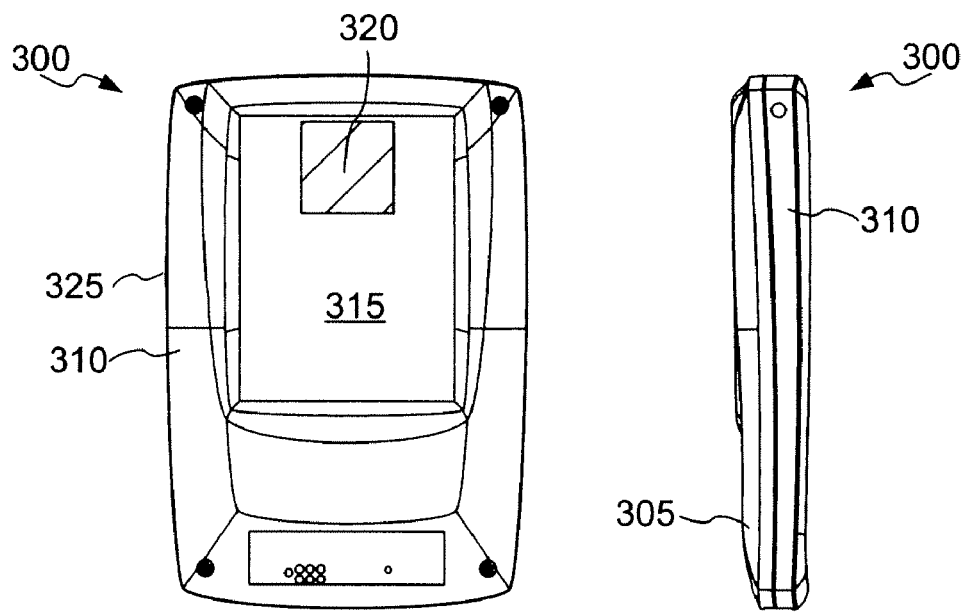
FIG. 3B is a rear elevation view of the apparatus of FIG. 3A.
FIG. 3D is a right elevation view of the apparatus of FIG. 3A.

Turning now to FIG. 3B,

FIG. 3B is a rear elevation view of the apparatus of FIG. 3A. Fingerprint portion 320 is preferably disposed near the top of touch surface 315, while touch surface 315 is preferably disposed near the top of rear face 310. This arrangement facilitates support of the device 300 by placement of the lower portion of rear face 310 in the palm while allowing at least one finger access to touch surface 315 and fingerprint portion 320. An optional escape key 325 is also provided.

Figure 3C:
FIG. 3C is a bottom elevation view of the apparatus of FIG. 3A.

Turning now to FIGS. 3C and 3D,

FIG. 3C is a bottom elevation view of the apparatus of FIG. 3A while

FIG. 3D is a right elevation view of the apparatus of FIG. 3A. From these vantage points, neither the touch surface 315 nor the fingerprint portion 320 can be seen advantageously ensuring that the profile of device 300 remains substantially the same as if it were not provided with these features, thereby allowing for device 300 to continue to be employed with existing peripherals, docking cradles, holsters, etc. traditionally co-operating with device 300.

Figure 4C:
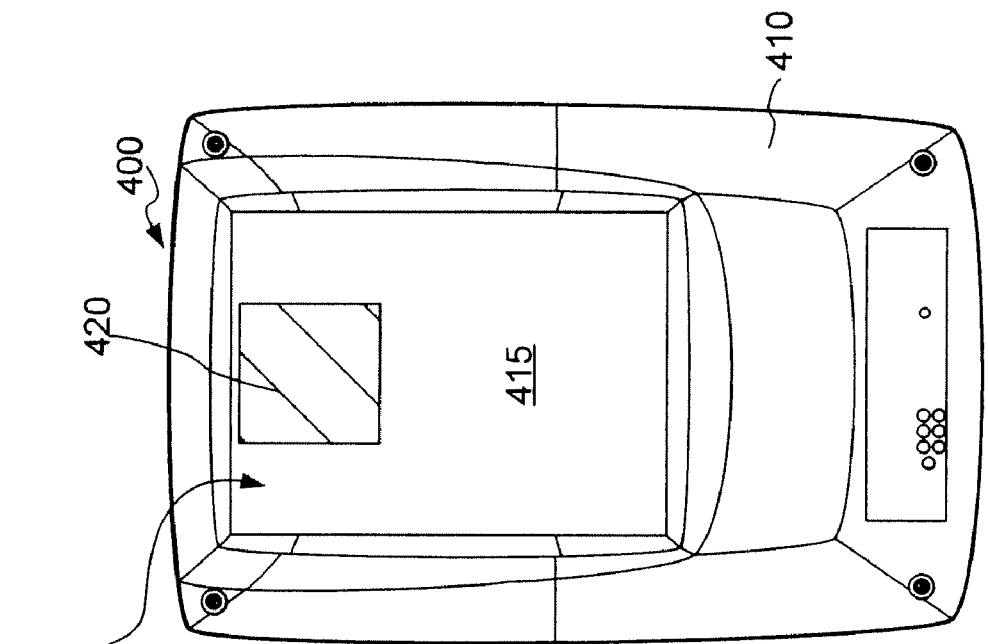
FIG. 4C is a rear elevation view of the apparatus of FIG. 4A.
Figure 4B:
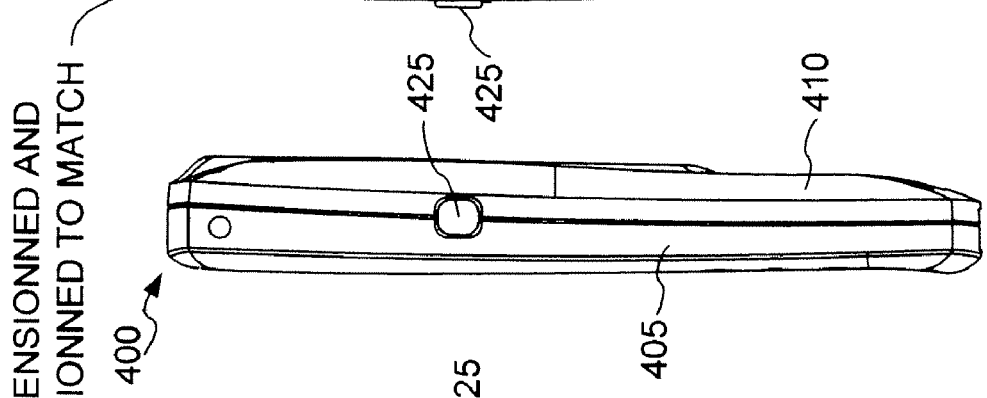
FIG. 4B is a right elevation view of the apparatus of FIG. 4A.
Figure 4A:
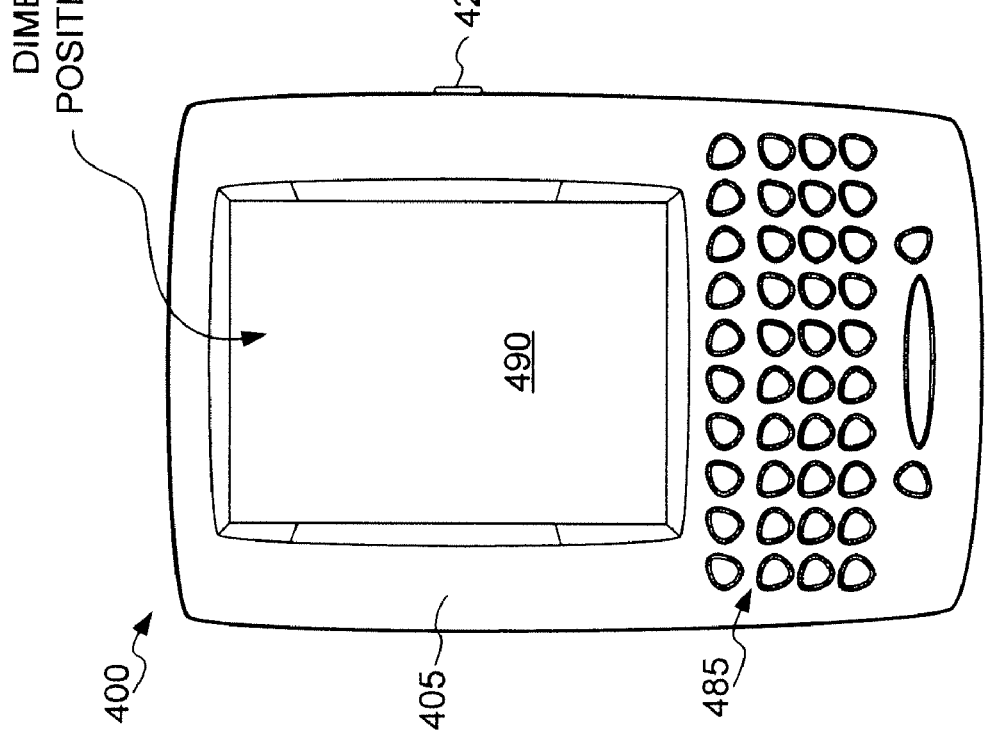
FIG. 4A is a top elevation view of a third handheld device embodiment of an apparatus provided in accordance with the present application.

Turning now to FIG. 4A,

FIG. 4A is a top elevation view of a third handheld device embodiment of an apparatus provided in accordance with the present application. A combined touch-pad/fingerprint is provided integral to handheld electronic device 400. Advantageously, the combined touch-pad/fingerprint is not visible on the front face 405 of handheld device 400 so that screen 490 is contemporaneously entirely visible while the touch-pad/fingerprint surface is manipulated. Device 400 is provided with an optional keyboard 485 and optional escape key 425.

Turning now to FIG. 4B,

FIG. 4B is a right elevation view of the apparatus of FIG. 4A. From this vantage point, neither the touch surface 415 nor the fingerprint portion 420 can be seen advantageously ensuring that the profile of device 400 remains substantially the same as if it were not provided with these features, thereby allowing for device 400 to continue to be employed with existing peripherals, docking cradles, holsters, etc. traditionally co-operating with device 300.

Turning now to FIG. 4C,

FIG. 4C is a rear elevation view of the apparatus of FIG. 4A. Touch surface 415 and fingerprint portion 420 enable a user to provide input to and preferably control device 300. Preferably, touch surface 415 and fingerprint portion 420 are provided on the rear face 410 of device 400 so that the surface area of front face 405 can provide a more traditional user interface including a screen 405 and keyboard 485. Preferably, touch surface 415 is dimensioned and sized to match screen 490. Operationally, the user of device 400 can operate touch surface 415 and fingerprint portion 420 with one or more fingers of the hand which holds device 300, for instance by supporting the lower portion of rear face 410 in the palm while viewing front face 405 so as to allow at least one finger to access touch surface 415 and fingerprint portion 420. Advantageously, screen 490 remains unobstructed during these manipulations.

Figure 5:
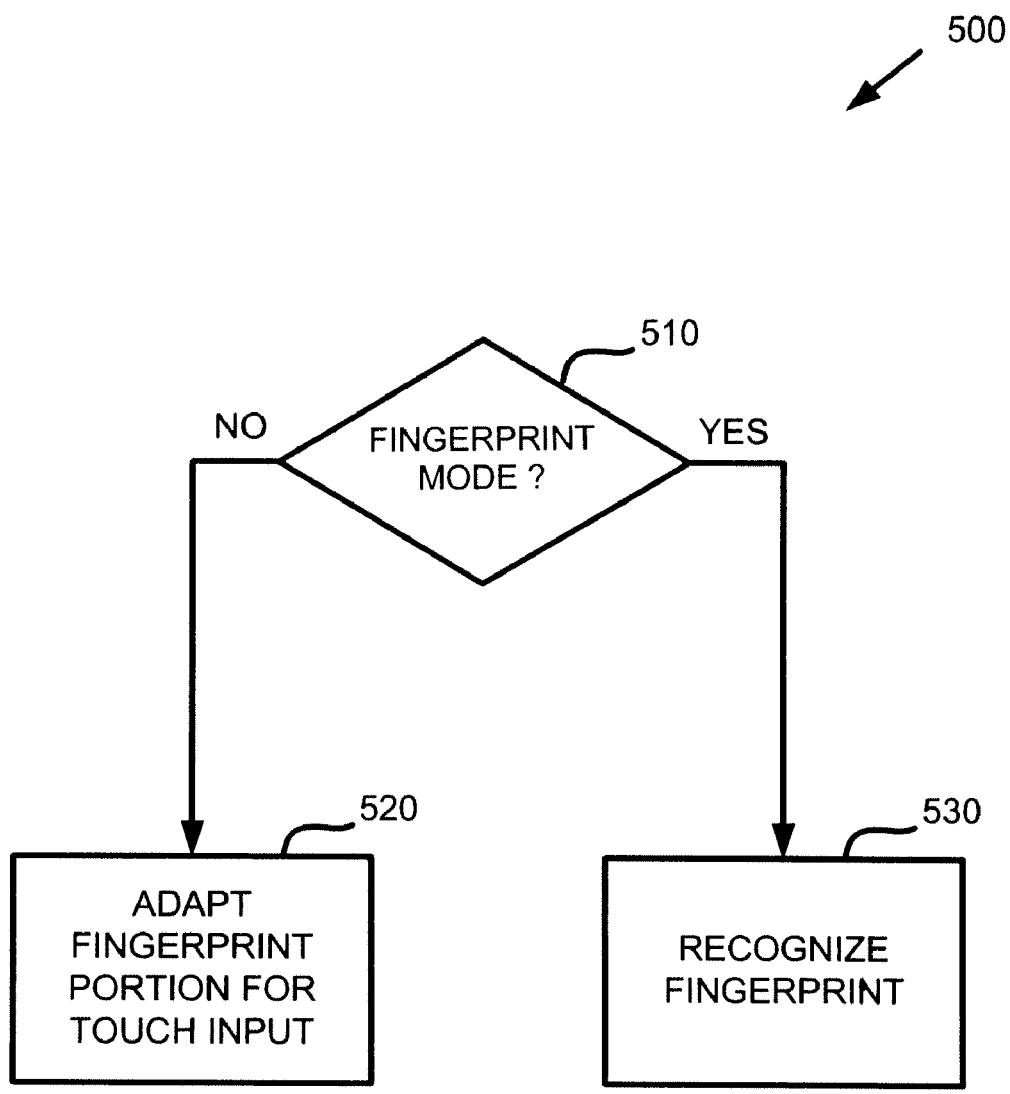
FIG. 5 is a flow chart illustrating an embodiment of a method provided in accordance with the present application.

Referring now to FIG. 5,

FIG. 5 is a flow chart illustrating an embodiment of a method provided in accordance with the present application. Referring to flow-chart 500, at step 510 the method determines if the fingerprint portion is to be used in fingerprint mode, or for touch input. If fingerprint mode is determined at step 510, then at step 530 the fingerprint portion is used to recognize a fingerprint. However, if fingerprint mode is not determined at step 510, then at step 520 the fingerprint portion is adapted for touch input, for example by sub-sampling the higher resolution fingerprint mode so that it is operated at a resolution which is comparable to the remaining portion of the touch surface.

The above-described embodiments of the present application are intended to be examples only. Those of skill in the art may effect alterations, modifications and variations to the particular embodiments without departing from the scope of the application.

The invention claimed is:

1. An apparatus for input and fingerprint recognition comprising:
   a touch surface comprising a first region and a second region, the second region being distinct from and coplanar with the first region and occupying a minor portion of a total surface area of the touch surface; and,
   a data processor coupled to the touch surface, the data processor being configured to selectively operate the touch surface in one of a touch input mode and a fingerprint detection mode, in the touch input mode the data processor being configured to operate the second region at a first resolution comparable to that of the first region to detect a touch input anywhere on the touch surface, in the fingerprint detection mode the data processor being configured to operate the second region at a higher resolution than the first resolution to detect a fingerprint on the second region.

2. The apparatus according to claim 1, wherein the second region is disposed proximate an end of the touch surface.

3. The apparatus according to claim 2, further comprising a housing, the touch surface and the data processor being disposed within the housing, the housing being configured for releasable attachment to a handheld electronic device.

4. The apparatus according to claim 3, wherein the housing has a communication interface at one end thereof for interfacing with the handheld electronic device.

5. The apparatus according to claim 4, wherein the housing has a shape corresponding to that of the handheld electronic device.

6. The apparatus according to claim 5, wherein the handheld electronic device includes a display screen on one side thereof, and the touch surface corresponds in shape to the display screen.

7. A handheld electronic device comprising:
   a housing;
   a display screen; and
   an apparatus for input and fingerprint recognition comprising:
      a touch surface comprising a first region and a second region, the second region being distinct from and coplanar with the first region and occupying a minor portion of a total surface area of the touch surface; and,
      a data processor coupled to the touch surface, the data processor being configured to selectively operate the touch surface in one of a touch input mode and a fingerprint detection mode, in the touch input mode the data processor being configured to operate the second region at a first resolution comparable to that of the first region to detect a touch input anywhere on the touch surface, in the fingerprint detection mode the data processor being configured to operate the second region at a higher resolution than the first resolution to detect a fingerprint on the second region, wherein the display screen and the touch surface are disposed within the housing, the display screen is disposed at one side of the housing, and the touch surface is disposed at another side of the housing opposite to the one side.

8. The apparatus according to claim 7, wherein the touch surface has a shape analogous to the display screen.

9. The apparatus according to claim 7, wherein the second region is disposed proximate an end of the housing.

10. The handheld electronic device according to claim 7, wherein the handheld electronic device is a wireless device.

11. A method of input and fingerprint recognition comprising:
   operating a touch surface at a first resolution to detect a touch input anywhere on the touch surface, the touch surface comprising a first region and a second region, the second region being distinct from and coplanar with the first region and occupying a minor portion of a total surface area of the touch surface; and
   upon detecting a fingerprint mode for the touch surface, operating the second region at a higher resolution than the first resolution insert to detect a fingerprint on the second region.

12. The method according to claim 11, wherein the higher resolution operating comprises operating the second region at the higher resolution without operating the first region at the higher resolution.

* * * * *